United States Patent [19]
Kopka

[11] Patent Number: 5,402,229
[45] Date of Patent: Mar. 28, 1995

[54] APPARATUS FOR PROCESSING THE FREQUENCY OF A SIGNAL

[75] Inventor: Michael Kopka, Dortmund, Germany

[73] Assignee: Mesacon Gesellschaft fur MeBtechnik mbH, Germany

[21] Appl. No.: 783,343

[22] Filed: Oct. 28, 1991

[30] Foreign Application Priority Data

Oct. 26, 1990 [DE] Germany .......................... 9014815 U

[51] Int. Cl.⁶ .............................................. G01B 9/02
[52] U.S. Cl. ..................................... 356/349; 356/358
[58] Field of Search ............. 356/345, 349, 358, 28.5; 324/78 D; 377/31; 455/158

[56] References Cited

U.S. PATENT DOCUMENTS 4,859,934  8/1989  Gale et al. ........................ 324/78 D
5,066,128  11/1991  Lu ....................................... 356/349
5,070,260  12/1991  Wong ................................. 356/349

*Primary Examiner*—Samuel A. Turner
*Attorney, Agent, or Firm*—Banner, Birch, McKie & Beckett

[57] ABSTRACT

The invention concerns a signal frequency processing device for measuring the frequency of an input signal with the aid of very simple counters. The input signal to be measured is divided into two, four or even more partial signals, each partial signal having a frequency which is half, a fourth or an even higher fraction of the input signal's frequency. In this way rather slow, cheap and small counting devices can be used for counting fractions of the input signal which are later accumulated again to end up with a frequency which is identical with the frequency of the input signal. The input signal is thus retrieved.

19 Claims, 1 Drawing Sheet

# APPARATUS FOR PROCESSING THE FREQUENCY OF A SIGNAL

BACKGROUND OF THE INVENTION

1. Field of the Invention

The invention relates to an optical instrument for measuring the speed or length of a moving surface, in which a measuring light beam from a laser is directed onto the surface and the Doppler-shifted stray light reflected by the surface and other light, e.g. non-Doppler-shifted laser light or some other Doppler-shifted laser light are superimposed for obtaining a beat, whose frequency forms a measure for the speed of the surface and is received and evaluated in an evaluation system in the form of continuously occuring digital signals, especially counted in a counter.

The accuracy of the measurement is inter alia dependent on the counting accuracy, i.e. on whether the occuring signals are continuously counted in a loss-free manner and the count results are also continuously supplied to the parts of the evaluation system following the counting system.

2. Prior Art

As the signal corresponding to the input frequency $F_{in}$ occur in a high measuring frequency range, the counting frequency is correspondingly high and can easily reach 10 MHz. If the counting system is in TTL technology, the use of a plurality of TTL components is necessary in view of the high counting frequency and these take up an undesirably large amount of space. Other solutions in discreet logic with low integration level are excluded due to the high counting frequency. It is also not possible to use a lower measuring frequency in the counting system, because the result cannot be in accordance with the required counting accuracy.

OBJECT OF THE INVENTION

The object of the invention is therefore to provide a counting system, which has a high counting frequency and which can be realized with relatively simple means and in particular with little space, but still has the necessary counting accuracy.

SUMMARY OF THE INVENTION

According to the invention this object is met in that the beat signal having a frequency representative of the measured phenomenon serves as an input signal for evaluating said beat signal to retrieve the magnitude of said measured phenomenon with the aid of frequency divider means for dividing said beat signal frequency a plurality of times to provide a plurality of signals having the same frequency, frequency counter means associated with each of said plurality of signals for separately counting the frequency of each of said plurality of signals to provide respective output frequency signal counts and combining means coupled to each of said frequency counter means for combining said frequency count signals in a manner which corresponds to the frequeny of said beat signal so that said information conveyed by the frequency of said beat signal can be retrieved.

The decisive advantage of the system according to the invention is that despite the high counting frequency required, it is possible to use standardized counters, particularly in LSI technology, which nave a limited upper counting frequency, i.e. are slower than e.g. 10 MHz and instead have, if anything, a 7 MHz counting frequency. The use of these slower counters is made possible by the subdivision of the input frequency $F_{in}$ into a corresponding number of partial frequencies $F_{part}$, so that the standardized counters used in each case take over a lower measuring frequency, which is always below the counting frequency thereof. The signal counts are continuously evaluated and added by means of an in particular software-realizable adder, i.e. at relatively low cost, so that as a result the desired input frequency $F_{in}$ is obtained. The prerequisite is the use of synchronous counters. If it is sufficient to divide up the signals over two counters, then a simple flip-flop circuit can be used as the frequency divider. If the number n of necessary, simple, standardized counters exceeds 2, then it is necessary to have a corresponding control logic for controlling the frequency dividing system.

The system according to the invention is a counting system with a high counting frequency, so that the occuring signals can be counted in loss-free manner. By choosing a corresponding number of n counters, the counting frequency can be readily increased beyond e.g. 10 MHz. The standardized counters which can be used take up very little space. A counting system produced in TTL technology requires roughly 10 times the amount of space. Standardized or finished integrated counters are easy to use, can easily be connected to microprocessors and also have the aforementioned, important advantage of a limited space requirement. The use of several synchronous counters offers the advantages of a highly integrated component in conjunction with an extremely high counting frequency. The subdivision of the signals corresponding to the input frequency $F_{in}$ is carried out by simple, rapid switching, preferably in programmable logic.

According to the invention the subdivision of the signals appropriately takes place in such a way that the positive and negative edge of each digital signal cycle of the input frequency $F_{in}$ is used for producing a first and a second partial frequency $F_{part1}$ and $F_{part2}$, which can be subdivided in the same way for forming further partial frequencies $F_{part}$ until n partial frequencies are reached.

BRIEF DESCRIPTION OF THE DRAWINGS

The invention is described in greater detail hereinafter relative to non-limitative embodiments and the attached drawings, wherein show.

DETAILED DESCRIPTION OF THE EMBODIMENTS

Figure 1:
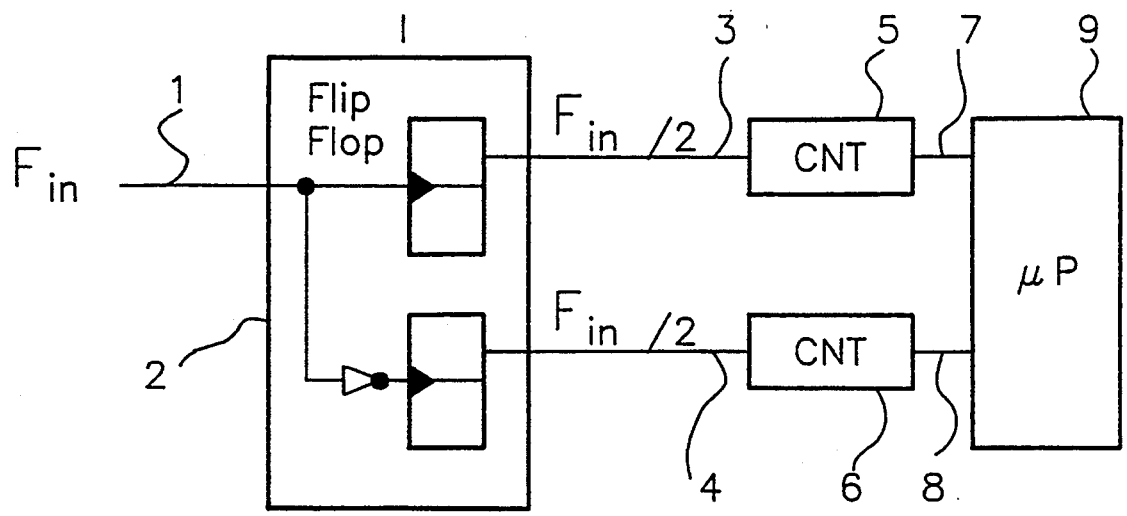
FIG. 1 A simplified representation of an electrical or electronic circuit of a counting system.

The signals corresponding to the input frequency $F_{in}$ pass via a line 1 into an information divider I, which is in the present case constructed as a frequency divider 2 in the form of a flip-flop circuit. The signals leave the first output of the frequency divider 2 with a partial frequency $F_{part1}$, which is in the present case $F_{in}/2$ and pass via the line 3 to a standardized counter 5, where they are counted. Correspondingly the second output of the frequency divider supplies signals, whose partial frequency $F_{pstt2}$ corresponds to the frequency $F_{in}/2$ and pass via a line 4 into a second, standardized synchronous counter 6, where they are also counted. The signal counts of the two counters 5, 6, are continuously evaluated by an adder 9 via lines 7,8 so that the input frequency $F_{in}$ is continuously obtained.

Figure 2:
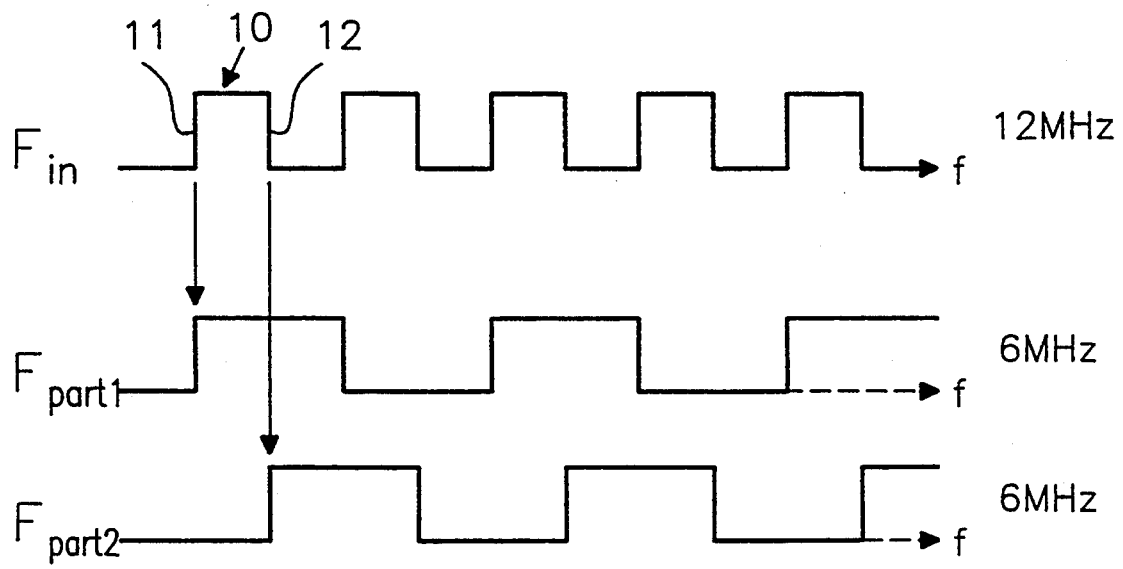
FIG. 2 A diagrammatic representation of the subdivision of an input frequency $F_{in}$ over two partial frequencies $F_{part}$.

FIG. 2 shows how the input frequency $F_{in}$ is subdivided into corresponding partial frequencies $F_{part}$. The positive edge 11 of each signal cycle 10 of the input frequency $F_{in}$ is used for forming an intermediate or partial frequency $F_{part1}$. The negative edge 12 of each signal cycle 10 is used for forming a further partial frequency $F_{part2}$. Thus, in the specific case an input frequency $F_{in}$ of 12 MHz is subdivided into two partial frequencies $F_{part1}$ and $F_{part2}$ of 6 Mhz in each case as can be gathered from FIG. 2. If an even higher resolution is required, the subdivision can be continued in the same way, so that the input frequency $F_{in}$ is finally subdivided into n partial frequencies.

In the specific cased if the measuring frequency is approximately 10 MHz, a single division is adequate, i.e. a subdivision over two counters 5, 6, as shown in the circuit of FIG. 1 and each counter can e.g. have a limited upper frequency of 7.5 MHz, which is generally the upper limit of synchronous, standardized counters as a peripheral component for microprocessor systems. In the embodiment the adder 9 is constituted by a microprocessor, whose cost is limited.

Figure 3:
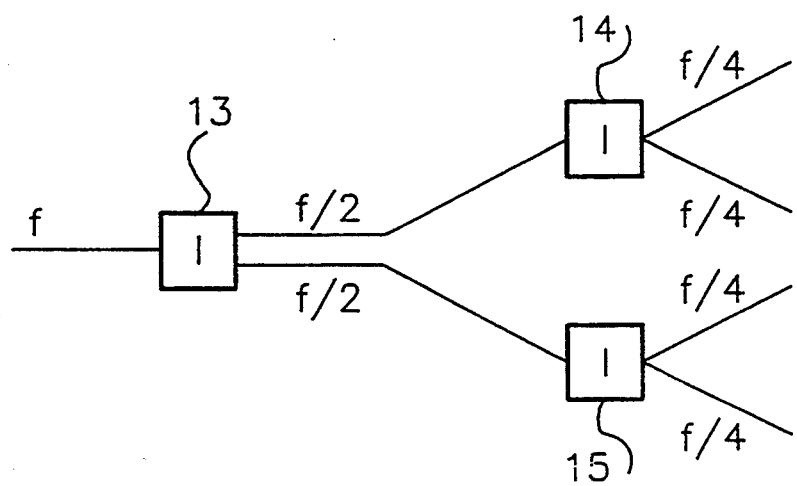
FIG. 3 A diagrammatic representation of a dividing system.

FIG. 3 diagrammatically illustrates the course of the subdivision of a frequency f by an information divider 13 on which the counting system according to the invention is based. Two partial frequencies f/2 are produced, which in the following, further information dividers 14, 15 are again subdivided into further partial frequencies f/4. This system can be virtually extended at will, as a function of the requisite frequency division.

The present invention leads to an extension of the input frequency range of a simple, standardized counter, without the counting accuracy being impaired.

What is claimed is:

1. A signal frequency processing device for measuring the frequency of an input signal, wherein the frequency of said input signal conveys information relative to a measured phenomenon, said device comprising:
   signal input means for receiving said input signal;
   frequency divider means coupled to said signal input means for receiving said input signal and dividing the frequency of said input signal to provide first and second frequency signals each having a frequency of one-half the frequency of said input signal;
   first and second frequency counter means coupled to said frequency divider means for receiving said first and second frequency signals respectively and separately counting the frequency of said first and second frequency signals to provide respective first and second output frequency signal counts; and
   combining means coupled to said first and second frequency counter means for combining said first and second signal frequency counts in a manner which corresponds to the frequency of said input signal so that said information conveyed by the frequency of said input signal can be retrieved.

2. A signal frequency processing device in accordance with claim 1 further comprising second and third frequency divider means coupled to said frequency divider means for receiving said first and second frequency signals respectively and separately dividing said first and second frequency signals to provide two pairs of third and fourth frequency signals each signal having a frequency of one-half the frequency of their respective said first and second frequency signals.

3. A signal frequency processing device in accordance with claim 2 further comprising two pairs of third and fourth frequency counter means, one of said pairs being coupled to said first frequency divider means for receiving a respective one of said pairs of third and fourth frequency signals respectively and separately counting the frequency of said third and fourth frequency signals to provide respective third and fourth output frequency signal counts, the other of said pairs being coupled to said second frequency divider means for receiving the other of said pairs of third and fourth frequency signals respectively and separately counting the frequency of said third and fourth frequency signals to provide respective third and fourth output frequency signal counts.

4. A signal frequency processing device in accordance with claim 3 wherein said combining means includes coupling means for coupling said combining means to all of said frequency counter means for combining all of said frequency count signals in a manner which corresponds to the frequency of said input signal so that said information conveyed by the frequency of said input signal can be retrieved.

5. A signal frequency processing device in accordance with claim 1 wherein said frequency divider means is formed of a flip-flop.

6. A signal frequency processing device in accordance with claim 4 wherein said frequency divider means are formed of a flip-flop.

7. A signal frequency processing device in accordance with claim 1 wherein said first and second frequency counter means are formed of first and second synchronous counters.

8. A signal frequency processing device in accordance with claim 4 wherein said frequency counter means are formed of first and second synchronous counters.

9. A signal frequency processing device in accordance with claim 1 wherein said combining means is formed of an adder.

10. A signal frequency processing device in accordance with claim 4 wherein said combining means is formed of an adder.

11. A signal frequency processing device in accordance with claim 1 wherein said combining means is formed of a microprocessor.

12. A signal frequency processing device in accordance with claim 4 wherein said combining means is formed of a microprocessor.

13. A signal frequency processing device in accordance claim 1 wherein each cycle of said input signal and each cycle of said first and second frequency signals have a rising and a falling edge.

14. A signal frequency processing device in accordance with claim 13 wherein the rising edge of each cycle of said first frequency signal coincides with the rising edge of each cycle of said input signal.

15. A signal frequency processing device in accordance with claim 14 wherein the rising edge of each cycle of said second frequency signal coincides with the falling edge of each cycle of said input signal.

16. A signal frequency processing device in accordance with claim 14 wherein the period between the rising edge of said first frequency signal and the rising edge of said second frequency signal is dependent on the frequency of said input signal.

17. In an optical instrument for measuring a physical phenomenon associated with a moving surface, wherein a measuring light beam is directed onto said surface and the Doppler-shifted light reflected by said surface combines with other light to obtain a beat signal having a frequency representative of the measured phenomenon, and wherein said beat signal serves as an input signal to evaluation means for evaluating said beat signal to retrieve the magnitude of said measured phenomenon, the imoprovement comprising:

frequency divider means for dividing said beat signal frequency a plurality of times to provide a plurality of signals having the same frequeny;

frequency counter means associated with each of said plurality of signals for separately counting the frequency of each of said plurality of signals to provide respective output frequency signal counts; and combining means coupled to each of said frequency counter means for combining said frequency count signals in a manner which corresponds to the frequency of said beat signal so that said information conveyed by the frequency of said beat signal can be retrieved.

18. An optical instrument in accordance with claim 17 wherein each cycle of said beat signal and each cycle of said plurality of frequency signals have a rising and a falling edge.

19. An optical instrument in accordance with claim 18 wherein the period between the rising edge of said beat frequency signal and the leading edge of each of said plurality of frequency signal is dependent on the frequency of said beat frequency signal.

* * * * *